US008060590B2

(12) United States Patent
Löbbert (10) Patent No.: US 8,060,590 B2
(45) Date of Patent: Nov. 15, 2011

(54) DISTANCE-AWARE SERVICE DISCOVERY MECHANISM FOR DETERMINING THE AVAILABILITY OF REMOTE SERVICES IN WIRELESS PERSONAL AREA NETWORKS

(75) Inventor: Johannes Löbbert, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 1100 days.

(21) Appl. No.: 10/878,906

(22) Filed: Jun. 28, 2004

(65) Prior Publication Data
US 2005/0021725 A1 Jan. 27, 2005

(30) Foreign Application Priority Data
Jun. 30, 2003 (EP) .................................... 03014859

(51) Int. Cl.
G06F 15/16 (2006.01)
G06F 15/173 (2006.01)
(52) U.S. Cl. ......... 709/223; 709/201; 709/202; 709/203
(58) Field of Classification Search .................. 709/203, 709/201, 202, 223
See application file for complete search history.

(56) References Cited

U.S. PATENT DOCUMENTS

| 5,910,179 | A | * | 6/1999 | Mohseni | 709/252 |
|---|---|---|---|---|---|
| 6,397,061 | B1 | | 5/2002 | Jordan et al. | |
| 6,430,395 | B2 | | 8/2002 | Arazi et al. | |
| 6,463,142 | B1 | | 10/2002 | Kilp | |
| 6,470,189 | B1 | | 10/2002 | Hill et al. | |
| 6,590,928 | B1 | * | 7/2003 | Haartsen | 375/134 |
| 6,697,792 | B2 | * | 2/2004 | Bunney et al. | 707/1 |
| 6,724,733 | B1 | * | 4/2004 | Schuba et al. | 370/252 |
| 6,763,014 | B2 | * | 7/2004 | Kennedy | 370/338 |
| 6,813,272 | B1 | * | 11/2004 | An et al. | 370/395.21 |
| 6,868,441 | B2 | * | 3/2005 | Greene et al. | 709/220 |
| 7,164,885 | B2 | * | 1/2007 | Jonsson et al. | 455/41.2 |
| 2001/0003191 | A1 | * | 6/2001 | Kovacs et al. | 709/226 |
| 2001/0033554 | A1 | | 10/2001 | Ayyagari et al. | |
| 2001/0052858 | A1 | | 12/2001 | Vincent et al. | |
| 2002/0022453 | A1 | * | 2/2002 | Balog et al. | 455/41 |
| 2002/0032765 | A1 | | 3/2002 | Pezzutti | |
| 2002/0037700 | A1 | | 3/2002 | Dooley et al. | |
| 2002/0120750 | A1 | | 8/2002 | Nidd | |
| 2003/0036350 | A1 | | 2/2003 | Jonsson et al. | |
| 2004/0044727 | A1 | * | 3/2004 | Abdelaziz et al. | 709/203 |

FOREIGN PATENT DOCUMENTS

| EP | 1 022 876 A1 | 7/2000 |
|---|---|---|
| EP | 1 024 628 A1 | 8/2000 |
| EP | 1 227 689 A1 | 7/2002 |
| EP | 1 289 200 A1 | 3/2003 |

(Continued)

OTHER PUBLICATIONS

"Bluetooth Personal Area Networking Profile", Jun. 26, 2001, pp. 1-63.

(Continued)

*Primary Examiner* — Peling Shaw
*Assistant Examiner* — Umar Cheema
(74) *Attorney, Agent, or Firm* — Oblon, Spivak, McClelland, Maier & Neustadt, L.L.P.

(57) ABSTRACT

A method for determining availability of requested services in a client/server-based network, in which each of a plurality of client terminals is connected to a file and/or application server via a wireless network.

5 Claims, 3 Drawing Sheets

FOREIGN PATENT DOCUMENTS

| WO | WO 01/62019 A2 | 8/2001 |
| WO | WO 02/23826 A2 | 3/2002 |
| WO | WO 02/39484 A2 | 5/2002 |
| WO | WO 02/45382 A2 | 6/2002 |
| WO | WO 02/078272 A1 | 10/2002 |
| WO | WO 02/084975 A2 | 10/2002 |

OTHER PUBLICATIONS

UPnP™ Forum, UPnP Device Architecture V1.0 Annex A-IP Version 6 Support, 1999-2002 Microsoft Corporation, 10 pages.

UPnP™ Vendor's Implementation Guide, Unversal Plug and Play Vendor's Implementation Guide, Jan. 5, 2001, p. 1-7.

Device Type: V Device Template Version 1.01, for UPnP™ Version 1.0, "Design Start (TDS); Preliminary Design (TPD); design Complete V.9 (TDC); Approved", Jan. 16, 2001, pp. 8.

Bluetooth SIG Confidential, Personal Area Networking Profile, Feb. 14, 2003, p. 1-65.

Ranata, et al., Human Interface Device (HID) Profile, May 22, 2003, pp. 1-123, Version 1.0, Bluetooth HID Profile.

Bluetooth Audo Video Working Group, Audio/Video Distribution Transport Protocol Specification, May 22, 2003, pp. 1-145.

UPnp™ Documents, "UPnP™ Service Checklist Version 1.01", Jan. 22, 2001, pp. 1-7.

UPnP™ Documents, UPnP™ Device Checklist Version 1.01, Jan. 22, 2001, pp. 1-5.

UPnP™ Forum, UPnP Device Architecture V1.0 Annex A—IP Version 6 Support, 1999-2002 Microsoft Corporation, pp. 1-10.

Universal Plug and Play Vendor's Implementation Guide, "UPnP™ Vendor's Implementation Guide", Jan. 5, 2001, pp. 1-7.

Contributing Members of the UPnP™ Forum, Device Type: V Device Template Version 1.01, for UpnP™ Version 1.0, Status: Design Start (TDS); Preliminary Design (TPD); Design Complete V.9 (TDC) Approved, Jan. 16, 2001, pp. 1-8.

Bluetooth, "Personal Area Networking Profile", Feb. 14, 2003, pp. 1-65.

Bluetooth Audio Video Working Group, "Advanced Audio Distribution Profile Specification Adopted Version 1.0", May 22, 2003, pp. 1-75.

Bluetooth Audio Video Working Group, "Audio/Video Remote Control Profile Version 1.0 Adopted", May 22, 2003, pp. 1-52.

Bluetooth Specification Version 1.1, "Part K: 3 Cordless Telephony Profile", Feb. 22, 2001, pp. 99-144.

Bluetooth Specification Version 1.1, "Part K:7 Dial-Up Networking Profile", Feb. 22, 2001, pp. 227-250.

Bluetooth Specification Version 1.1, "Fax Profile", Feb. 22, 2001, pp. 251-272.

Bluetooth Specificaiton Version 1.1, "Part K:12 File Transfer Profile", Feb. 22, 2001, pp. 364-396.

Bluetooth Audio Video Working Group, "Generic Audio/Video Distribution Profile Version 1.0 Adopted", May 22, 2003, pp. 1-35.

Bluetooth Specification Version 1.1, "Part K:10 Generic Object Exchange Profile", Feb. 22, 2001, pp. 309-338.

Bluetooth Printing Working Group, "Hardcopy Cable Replacement Profile Interoperalbility Specification", Sep. 23, 2002, pp. 1-56.

Bluetooth Specification Version 1.1, "Part K:6 Headset Profile", Feb. 22, 2001, pp. 197-226.

Bluetooth Specification Version 1.1, "Part K:4 Intercom Profile", Feb. 22, 2001, pp. 145-170.

Bluetooth Specification Version 1.1, "Part K:11 Object Push Profile", Feb. 22, 2001, pp. 339-364.

Bluetooth, "Personal Area Networking Profile", Feb. 14, 2001, pp. 1-65.

Bluetooth Specification Version 1.1, "Part K:5 Serial Port Profile", Feb. 22, 2001, pp. 171-196.

Bluetooth Specification Version 1.1, "Part K:2 Service Discovery Application Profile", Feb. 22, 2001, pp. 63-98.

Bluetooth Specification Version 1.1, Part K:3 Synchronization Profile, Feb. 22, 2001, pp. 397-422.

Bluetooth Audio Video Working Group, "Audio/Video Control Transport Protocol Specification Version 1.0 Adopted", May 22, 2003, pp. 1-40.

Bluetooth Specification Version 1.1, Part F:2 IrDA Interoperability, Feb. 22, 2001, pp. 425-442.

Bluetooth Specification Version 1.1, "Part F:3 Telephony Control Protocol Specification TCS Binary", Feb. 22, 2001, pp. 443-510.

Bluetooth Specification Version 1.1, "Part F:1 RFComm with TS 07.10 Serial Port Emulation", Feb. 22, 2001, pp. 393-424.

* cited by examiner

FIG 6

600 time stamp: 1

Node: Service Provider I

| Service Name | Provided by Node | Network Distance |
|---|---|---|
| NetService | Service Provider I | 0 |

Node: Service Provider II

| Service Name | Provided by Node | Network Distance |
|---|---|---|
| NetService | Service Provider II | 0 | time stamp: 2

Node: Service Provider I

| Service Name | Provided by Node | Network Distance |
|---|---|---|
| NetService | Service Provider I | 0 |
| NetService | Service Provider II | 1 |

Node: Service Provider II

| Service Name | Provided by Node | Network Distance |
|---|---|---|
| NetService | Service Provider II | 0 |
| NetService | Service Provider I | 1 | time stamp: 3

Node: Service Provider I

| Service Name | Provided by Node | Network Distance |
|---|---|---|
| NetService | Service Provider I | 0 |
| NetService | Service Provider II | 1 |

Node: Service Provider II

| Service Name | Provided by Node | Network Distance |
|---|---|---|
| NetService | Service Provider II | 0 |
| NetService | Service Provider I | 1 |

Node: Intermediate Node

| Service Name | Provided by Node | Network Distance |
|---|---|---|
| NetService | Service Provider I | 1 |
| NetService | Service Provider II | 2 |

DISTANCE-AWARE SERVICE DISCOVERY MECHANISM FOR DETERMINING THE AVAILABILITY OF REMOTE SERVICES IN WIRELESS PERSONAL AREA NETWORKS

FIELD AND BACKGROUND OF THE INVENTION

The present invention generally relates to the field of service provisioning in wireless networks. Service discovery information needed for determining the availability of requested remote services in a wireless multi-hop network can be replicated by supporting service users to select the closest service provider offering a requested remote service at a network distance in the physical proximity of the respective user's client terminal that can be reached with a minimum of forwarding delay.

Today, distributed network environments offer a rich set of services to the users. Besides classical services, such as those offered by printers or local gateway routers, new types of services are becoming available. Examples include music-on-demand services and services which use computational infrastructure that is being deployed within the network. Enabling these devices and services to work together has become an important issue. Especially with the widespread use of new personal network-enabled mobile devices (such as PDAs and 3G telephones) and the emergence of near-ubiquitous communication infrastructure based on wired and wireless networks, it is becoming increasingly important to allow users and applications to interact with existing services without considerable need to configuration or administration. The key requirement for such a scheme is to enable services to advertise their existence and properties and also allow service users to discover the service they need and utilize it. These tasks are addressed by service discovery protocols. While service discovery technologies were originally developed for so-called "zero-configuration" networks (e.g. networks aimed at installation in the home environment), researchers began to investigate how they can also be used to support aspects of mobile and ubiquitous computing.

Service discovery protocols, which enable service providers to advertise capabilities to potential clients, thereby providing to clients and service providers a means for entering into a relationship, play a key role in mobile and wireless networks. Protocols addressing service discovery include e.g. IETF's Service Location Protocol (SLP), Sun Microsystems's Jini, Bluetooth's Service Discovery Protocol (SDP), Salutation—a nonproprietary service discovery protocol which is currently utilized by several shipping products—and the Universal Plug and Play (UPnP) protocol. To understand the central idea of the present invention, it is necessary to briefly describe conventional service discovery mechanisms and protocols that are used for determining the availability of requested services in a distributed network environment. In the following section, the Bluetooth Service Discovery Protocol (SDP) is described representative of all the aforementioned commonly used protocols.

A Bluetooth-enabled personal area network may consist of large-sized multi-hop networks in which mobile devices can communicate not only via the master with other mobile devices located in a single piconet but also with mobile nodes which can be reached over a multiplicity of intermediate nodes. Mobile devices are thus able to communicate and use services provided by other mobile devices or infrastructure systems. To allow mobile terminals to use these services, service providers have to publish all available services together with some basic configuration information, and service users have to be equipped with means for searching these services and selecting a specific service provider. The Bluetooth Service Discovery Protocol thereby defines how a Bluetooth client's application shall act to discover services offered by a directly connected Bluetooth SDP server and their characteristics. The protocol defines how a client terminal can search for a remote service based on specific attributes without knowing anything about the availability of said service.

Figure 1:
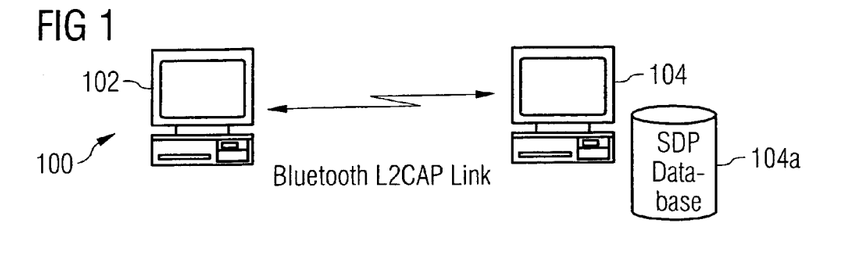
FIG. 1 is a schematic diagram illustrating a service discovery mechanism for a client/server system in a peer-to-peer network environment consisting of a wireless multi-hop network based on a store-and-forward messaging principle, wherein a peer which acts as a client terminal communicates with a peer acting as a file and/or application server of a single service provider via a Bluetooth data-link-layer protocol.
Figure 2:
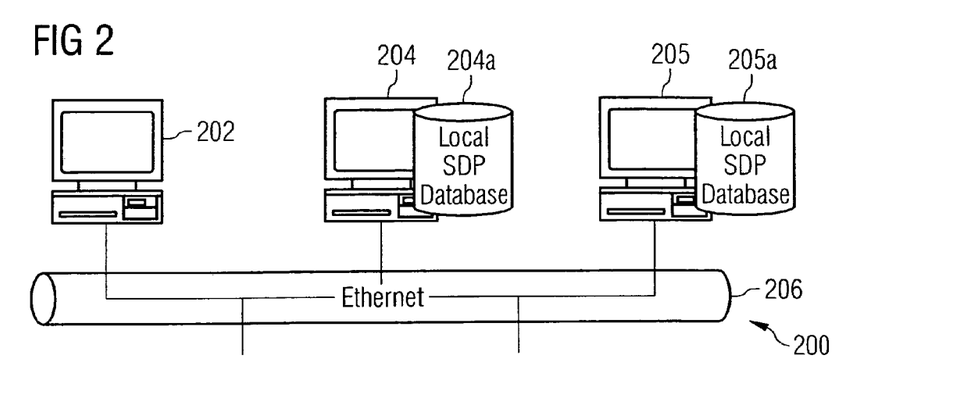
FIG. 2 is a schematic diagram illustrating a network-based service discovery mechanism for a client/server system in an Ethernet-based local area network using a store-and-forward messaging principle, wherein a client terminal is connected to the file and/or application servers of different service providers via said local area network and communication between said client terminal and said file and/or application servers is based on a service discovery protocol.

In general, service discovery mechanisms can be grouped into peer-to-peer- and network-based mechanisms. As described in section E from version 1.1 of the Bluetooth core specification (http://www.bluetooth.com/pdf/Bluetooth_11_Specifications_Book.pdf), which refers to the Bluetooth Service Discovery Protocol (SDP), peer-to-peer-based service discovery mechanisms can be used between two devices which are connected via a physical link, thereby using a Bluetooth data-link-layer protocol as e.g. the Logical Link Control and Adaptation Protocol (L2CAP). Thereby, one peer which acts as a client and one peer acting as a file and/or application server establish a direct radio link to detect and select a specific service. Typically, the following steps are carried out: First, an SDP client conducts a Bluetooth inquiry to detect active Bluetooth nodes in the radio range of the client terminal. After that, the service user (SDP client) selects one of the detected devices and opens an L2CAP channel on a well-known protocol/service multiplexer (PSM). An SDP client sends an SDP message to the service provider (SDP server) to check the availability and configuration information for known services or browse a service database on the SDP server as shown in FIG. 1. Depending on the scenario and the availability of the services, the node acting as an SDP client finally establishes a connection to the respective device to use the service or start a new service discovery procedure on another node.

As described in the specification of the Universal Plug and Play (UPnP) standard (http://www.upnp.org), network-based service discovery mechanisms can be used between two or more devices communicating via a broadcast or multicast medium such as a segment of an Ethernet-based local area network. In some wireless personal area technologies such a medium is emulated by means of wireless multi-hop networks which are based on a store-and-forward messaging principle, i.e. Bluetooth Personal Area Networks (PANs), as described in "Bluetooth Personal Area Networking Profile". In this specification it is described how two or more Bluetooth-enabled devices can form a mobile ad-hoc network and how the same mechanism can be applied to access a remote network through a network access point. Thereby, the SDP client sends a service discovery message to the broad- or multicast medium. All SDP servers, which want to offer a specific service, listen to these messages and match the requested with the offered services. If a match is found, the relevant service provider sends a message to the client indicating the address of the service provider and the offered service.

BRIEF DESCRIPTION OF THE PRESENT STATE OF THE ART

U.S. Pat. No. 6,470,189 B1 refers to a method and apparatus in a wireless RF transceiver for seeking and transferring information available from a network server. A first transceiver thereby detects a need for desired information available from a network server. In response thereto and before contacting the network server, said first transceiver attempts to obtain the desired information from a second transceiver of a plurality of wireless RF transceivers in the vicinity of said first transceiver, thereby potentially eliminating a necessity for the first transceiver to contact the network server in order to obtain the desired information.

In U.S. Pat. No. 6,463,142 B1 a wireless communication system including a stationary unit, a mobile unit and a proxy server is disclosed. According to one embodiment of this invention, said stationary unit is adapted to transmit and receive messages, and the mobile unit is adapted to establish a communication link with the stationary unit and to transmit and receive messages. The proxy server is adapted to route messages to either the stationary unit or the mobile unit based on a certain status of the communication link between the stationary and the mobile unit. A further embodiment of this invention pertains to a method for routing messages that includes the step of monitoring the status of a communication link between a mobile and a stationary unit. Thereby, a message is received and routed to either the stationary unit or the mobile unit based on the status of the communication link.

U.S. Pat. No. 6,430,395 B2 relates to different methods for creating a cellular-like communication system, e.g. a wireless private branch exchange (WPBX) environment, which enables communication between mobile devices such as standard cordless phones (handsets), in particular mobile devices utilizing the Bluetooth short-range wireless communication protocol. These methods provide a seamless and reliable session handoff between different base stations while the mobile device is moving between picocells by implementing a high-level of synchronization between the base stations of said picocells and a switch. Thereby, base stations of picocells having a small coverage area communicate with the handsets. Said communication protocol is divided into a low-level protocol performed by the base stations and a high-level protocol performed by the switch, which is connected to all the base stations. According to this invention, these methods support mobile computing or telephony devices and communication protocols which are not specified to handle handoffs of sessions while moving between the coverage areas of base stations in a data, voice or telephony wireless network.

U.S. Pat. No. 6,397,061 B1 refers to a method and apparatus for reprioritizing data transfer in a short-range mobile ad-hoc network (MANET) applied to a wireless communication device capable of communicating with a local wireless network within a predetermined communication range. If the wireless communication device experiences interference, low battery power or movement outside of the predetermined communication range, the wireless communication device checks to see if a bandwidth, a data rate or a priority can be altered to complete the communication between the wireless communication device and the wireless network.

US 2002/0032765 A1 pertains to an intelligent network, which provides network access services (INP-NAS) and utilizes a network platform containing an application controller. The invention uses object and network discovery techniques to activate applications providing a class of useful network services that reduce service provision intervals and improve service provisioning, installation, service quality, security, and network engineering. Said network access services (NAS) implement intelligent network applications to provide or enable services such as network access with registration and navigation, service negotiation, "service on demand", disconnect services, rearrangement and move services, installation, service activation and provisioning, repair, "self-healing" network services such as recovery and restoration, engineering rearrangement and network management services. Benefits attributable to INP-NAS include offering instant services, reduced data lifecycle costs, improved data and process quality, faster network deployments due to the elimination of data precollection and scrubbing, and higher quality of network-based services, which results in lower operating costs and higher customer satisfaction.

US 2002/0037700 A1 refers to a communication system comprising a first and a second beacon device capable of wireless message transmission and at least one portable client device capable of receiving such message transmissions. The client device is arranged to broadcast an inquiry message according to a first communication protocol, e.g. based on Bluetooth. The first beacon device detects such inquiry messages and replies with an inquiry response containing an identifier for the second beacon device, which enables the second beacon device and the client device to perform a service interaction. In an alternative embodiment, receipt of the inquiry message is notified to the second beacon device, which then sends the inquiry response to the client device.

A communication device and software for operating multimedia applications in at least one communication network is described in US 2001/0003191 A1. The communication device comprises a computing manager unit for managing and providing multimedia applications on the basis of a communication with one or more communication devices in at least one communication network, whereby the computing manager unit controls a device discovery manager unit for detecting the availability of at least one device and/or at least one communication network, a service discovery manager unit for providing available services from and/or for said communication network, and a virtual device manager unit providing a graphical user interface (GUI) for controlling devices and/or services of said communication network. The invention particularly enables mobile multimedia applications to effectively use mobile ad-hoc networks (MANETs) in a simple and effective way.

US 2001/0033554 A1 shows remote control of devices in a piconet by remote users that communicate via a packet-switched communication network (e.g. the Internet) by providing a proxy-bridge device connecting remote users to a limited connectivity network. Thereby, said proxy-bridge device is a bridge for sending packets between an external device and a device in the piconet. Moreover, the proxy-bridge device also serves as a proxy for the external device to devices in the piconet and as a proxy for devices in the piconet accessing an external device. The protocol stack of the proxy-bridge device allows communication with the piconet devices within the piconet. In addition, the protocol stack allows an application to communicate with the remote device, e.g. via the Internet Protocol. The proxy-bridge device, which uses two protocols, thus enables remote users to discover the presence of service offered by a device in a piconet as a logical embedded device within the proxy-bridge device and vice versa.

US 2002/0120750 A1 describes a method, a wireless network device and a computer program product for performing service discovery in a pervasive wireless local area network, e.g. in an ad-hoc Bluetooth PAN consisting of a number of multi-hop networks. Disclosed is a star-shaped piconet where the piconet master replicates information about discovered services to the connected slaves such that particular devices can communicate not only via the master device in one piconet but also with nodes reachable via a multiplicity of intermediate nodes. Thereby, access protocols and service discovery protocols enabling a network device are disclosed. By replicating service discovery information, said devices can query faster which services are available. In a first state, a remote device is accessed in order to obtain information for the setup of the connection. In a second state, a connection is set up to the remote device in order to retrieve information related to services provided by the remote device, the discovered information being required to configure connections to the remote device and use the related services. In a third state, the device publishes actively forwards retrieved service information to other devices, which in turn update their lists of services available from devices connected to the pervasive network.

EP 1 227 689 A1 pertains to an entry gateway server provided to support mobile devices in the discovery process of local services. Said entry gateway server optimizes the discovery process and performs the discovery process for said mobile devices. In this way, usage of communication and computation resources can be reduced, which indirectly leads to the saving of battery power and therefore to a longer operation of the respective mobile device. Furthermore, the entry gateway server provides preconfigured service usage templates, thus reducing the overhead to configure the provided information to the user's needs. Thereby, the entry gateway server system can be a part of a general ad-hoc computing system allowing a mobile user optimized access to local resources.

US 2001/0052858 A1 refers to an access system providing access to an item of a server's automatic control equipment via a wireless proximity network. Said access system integrates transmission and/or reception means to transmit and/or receive messages on said wireless proximity network, thereby using a radio wave technology in compliance with the Bluetooth protocol. According to this invention, one item of the server's automatic control equipment comprises communication means to implement a link mechanism for supplying control, display and monitoring functions of said server's automatic control equipment from a mobile device or an item of the client's automatic control equipment.

EP 1 022 876 A1 refers to a method for advertising services offerings in wireless local area networks comprising at least two mobile terminals and an apparatus for exchanging service information with other mobile terminals. Said apparatus comprises a wireless transceiver, a processing unit, a memory for storing information about its local services and/or services provided by other mobile terminals as well as a protocol resource manager. This protocol resource manager triggers the wireless transceiver to send service information comprising information about itself and/or known mobile terminals to other mobile terminals, chooses a time-out period $T_A$ and ensures that the apparatus listens for up to a maximum time $T_A$ for service information received by said transceiver. If the time-out period $T_A$ has expired without having received such service information by said transceiver, the protocol resource manager triggers the transceiver to once again send service information comprising information about itself and/or known mobile terminals to other mobile terminals. If such service information was received by said transceiver prior to $T_A$ timing out, the protocol resource manager checks whether the service information received comprises information about itself. If this is the case, the protocol resource manager chooses another time-out period $T_A$ and continues with the step of ensuring that the apparatus listens for service information received by said transceiver. Otherwise, the protocol resource manager continues with the step of triggering the transceiver to send service information comprising information about itself and/or known mobile terminals to other mobile terminals.

A scheme and an apparatus for distinguishing services offered by a service-providing device in adjacency of the apparatus from services offered by a service-providing device not being in the apparatus' adjacency is described in EP 1 024 628 A1. All devices (including the apparatus) are part of a wireless local area network. As described in this invention, services from adjacent devices can be combined to build more complex services, in which the output of one service operation is further processed by another service running on a different device. Said apparatus maintains a record with information about services and associates identifiers and a list of identifiers about the service-providing devices. Thereby, associated identifiers and the list of said identifiers are compared to determine an associated service as being in adjacency of the apparatus if it is rendered by a service-providing device listed in the list of identifiers. An associated service is determined as not being in adjacency of the apparatus if it is rendered by a service-providing device which is not listed in the list of identifiers. The apparatus comprises a network interface for wireless communication with the service-providing devices and a service discovery module which maintains the record with information services and associated identifiers.

WO 02/078272 A1 refers to telecommunication networks with multi-hop wireless communication such as mobile ad-hoc networks (MANETs), wireless wide area networks, wireless bridging, and infrastructureless networks, wherein the transmission range of a node is limited and the topology of the network is dynamic, in particular to a method and a system for providing bridged mobile ad-hoc networks. The terminals in a mobile ad-hoc network are thereby adapted to act as data link layer bridges between other terminals that do not have a direct wireless link. Each terminal that acts as a bridge thereby broadcasts control information for other terminals directly in range or indirectly via other in-range bridges broadcasting to out-of-range terminals to update themselves with current network information. The terminals conditionally act as bridges in accordance with stored criteria based on current network information. Packet forwarding in such a mobile ad-hoc network can efficiently be realized based on the following provided network functions: path discovery, quality of service (QoS), handoff, auto-configuration, and service discovery.

An advanced system and method for dynamically discovering, provisioning and accessing host services on wireless data communication devices needed for sending a service book to a mobile device is described in WO 02/084975 A2. Such a service book includes a multiplicity of fields relating to a host service. Thereby, at least one mobile device is identified to receive the service book. Moreover, wireless propagation information is provided that identifies an address for the mobile device to receive the service book. This service book is then transmitted over a wireless network, thereby using the address for the respective mobile device, and received by said mobile device.

In WO 01/62019 A2 a dual-purpose bridge for wireless communication is described, which allows both a first wireless communication standard for low-frequency communication (i.e. below 1 GHz) and a second wireless communication standard for high-frequency communication (i.e. above 1 GHz) for operating a particular wireless communication device. Resources existing between the two bridged standards are shared to reduce the cost of implementing any of these two communication standards. The output signal of each communication systems is thereby coupled with a micro-controller unit (MCU). After having determined the wireless communication standard, which is used to transmit the output signal, the corresponding protocol is employed. Processing is performed in the MCU, and the resulting data can then be applied to a data port.

WO 02/23826 A2 pertains to a service framework supporting service discovery and connection, in particular to an information appliance system with a user device comprising a client platform that includes a service framework to discover and connect with a variety of services, both remote and local, transient and persistent, and to disconnect from said services when they are no longer of interest or become unavailable. The service framework provides a standard, consistent, simplified way for services to make themselves available and for services using entities to locate and connect with services of interest to them. When a service is requested from a remote server, a service frontend on the client platform attempts to find its corresponding service backend on a server providing the requested service and, if it finds it, the frontend and backend coalesce in a fully formed service that is made available to a requesting service-using entity. As a result, platform resources and security are maintained. Furthermore, various methods of operating a service framework are described.

WO 02/45382 A2 is directed to a method and device for providing a service record for an application (e.g. a legacy application) running on a virtual serial port of a wireless transceiver device, such as a Bluetooth-enabled device. The virtual serial port thereby accumulates a serial connection (e.g. a serial cable) for the application, which can be opened by a virtual serial port driver. In accordance with one embodiment of this invention, the virtual serial port driver also provides the service name of the application. The virtual serial port driver either derives the service name from the name of the application or uses a default name. Furthermore, said virtual serial port driver performs the function of automatically providing a service name for an application, thereby introducing a standard, efficient and user-friendly approach for providing a readily-identifiable service name for a legacy application.

PROBLEMS AND SHORTCOMINGS OF PRIOR-ART SOLUTIONS

A problem conventional service discovery mechanisms according to the state of the art are faced with consists in that in case a service is available on a multiplicity of wireless nodes within a large ad-hoc network, a client terminal is not able to select the requested remote service that is reachable with a minimum of intermediate nodes. This criterion is one of the main selection factors in low-bandwidth wireless multi-hop networks without native broad- or multicast capabilities.

OBJECT OF THE PRESENT INVENTION

In view of the explanations mentioned above it is the primary object of the present invention to propose a technology which improves peer-to-peer service discovery in a wireless network environment by supporting service users to select the closest service provider offering a requested service at a network distance in the physical proximity of the respective service user's client terminal. The service furthermore should be reached with a minimum of forwarding delay.

This object is achieved by means of the features of the independent claims. Advantageous features are defined in the subordinate claims. Further objects and advantages of the invention are apparent in the detailed description, which follows.

SUMMARY OF THE INVENTION

The proposed solution of the present invention is basically dedicated to a method for extending replicated service discovery information needed for determining the availability of requested (i.e. remote) services in the client/server-based environment of a wireless multi-hop network, e.g. a wireless personal area network (PAN) based i.e. on Bluetooth technology, and selecting the optimal service provider, wherein each of a multiplicity of client terminals is connectable to a file and/or application server of a specific service provider via a wireless multi-hop network based on a store-and-forward messaging principle.

Said method can especially comprise the steps of providing network distance information indicating the number of intermediate network nodes for accessing remotely accessible services between a client terminal and a number of file and/or application servers of different service providers within said wireless wireless multi-hop network and selecting a remote service running on a file and/or application server at a network distance in the physical proximity of the respective client terminal that can be reached from said client terminal with a minimum of forwarding delay based on said network distance information.

Furthermore, a mechanism for adapting service discovery information to dynamic changes in wireless multi-hop networks is proposed. By updating said service discovery information, the basic replication scheme is continuously adapted to the dynamicity in said network environment.

BRIEF DESCRIPTION OF THE DRAWINGS

Further advantages and possible applications of the present invention result from the subordinate claims as well as from the following description of the embodiments of the present invention, accompanied by the following drawings:

DETAILED DESCRIPTION OF THE PRESENT INVENTION

In the following, embodiments of the present invention as depicted in FIGS. 3 to 6 shall be explained in detail. The meaning of the symbols designated with reference numerals that are depicted in FIGS. 1 to 6 can be taken from an annexed table.

Figure 4:
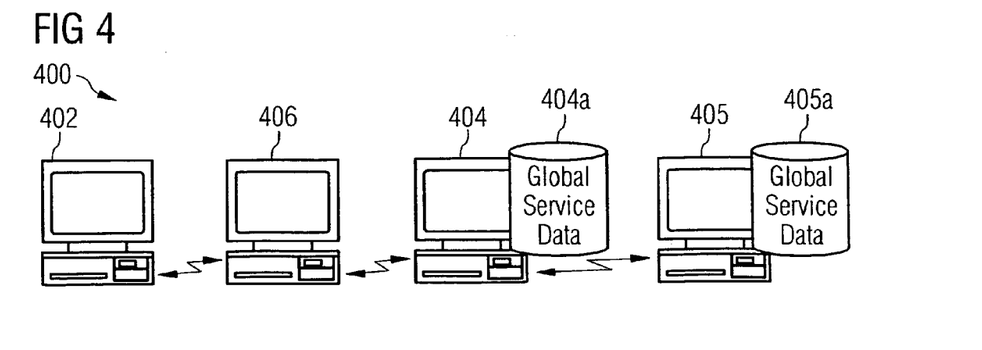
FIG. 4 is a schematic diagram illustrating a peer-to-peer service discovery mechanism for a client/server system in a peer-to-peer network environment with an extended personal area network topology, wherein service discovery information is replicated to multiple servers, e.g. a Bluetooth-enabled Personal Area Network for connecting wireless devices extending the Bluetooth Service Discovery Protocol (SDP), which consists of a number of wireless multi-hop networks based on a store-and-forward messaging principle, wherein a peer acting as a client terminal is wirelessly connected to peers acting as file and/or application servers of different service providers reachable over an intermediate network node via Bluetooth L2CAP channels.

According to one embodiment of the invention, service discovery information is dynamically adapted (S3) to information concerning varying resource availability and/or changing link characteristics within wireless multi-hop networks. In this connection, cached service discovery information is marked as "active" (S3a) only as long as a file and/or application server 404 or 405 participates in a wireless communication session with the client terminal 402 of the respective service user. The information is marked as "inactive" (S3b) when the connection between said server 404 or 405, respectively, and the respective client terminal 402 is closed and a predefined time-out period has expired, thereby discarding (S3c) outdated service discovery information. Aside from the aforementioned network distance, information indicating the usage of requested remote services can also be taken into account during the process of selecting (S2) a specific remote service.

In a further embodiment of the present invention, client terminals 402 are connected to file and/or application servers 404 and 405 of a number of service providers via a Bluetooth-enabled personal area network (PAN), and communication between said client terminals (402) and servers (404, 405) is based on an application-layer protocol such as the Bluetooth Service Discovery Protocol (SDP). The SDP servers 404 and 405 and intermediate network nodes 406 thereby act as proxy servers for accessing services that are locally and remotely accessible via these nodes.

As shown in FIG. 4, only service discovery information concerning services provided by servers, which are currently reachable via said intermediate nodes 406 are replicated. For this reason, said information must be updated as soon as nodes join or leave the network. Cached service discovery information is marked as "outdated" in case the device 404 or 405 offering the service does not participate in the network anymore. The outdated information is deleted after a predefined time-out period has expired and the respective device 404 or 405 remains disconnected. In case a client terminal 402 which does not implement a method according to the present invention queries SDP records of a file and/or application server 404 or 405 within said Bluetooth-enabled personal area network, only locally reachable services are returned.

In addition to the service discovery and addressing of information, each of said forwarding servers 406 maintains a parameter called "network distance" to allow an optimized service provider selection. This distance value denotes the number of intermediate hops between the client terminal 402 of the respective service user and the remote server 405 of a specific service provider offering a service requested by said service user. A node 404, which adds a remote service to the local service, database thereby increments the network distance to indicate that this service is reachable via intermediate nodes. Additional parameters such as usage information for the relevant service can also be taken into account during service selection.

Figure 3:
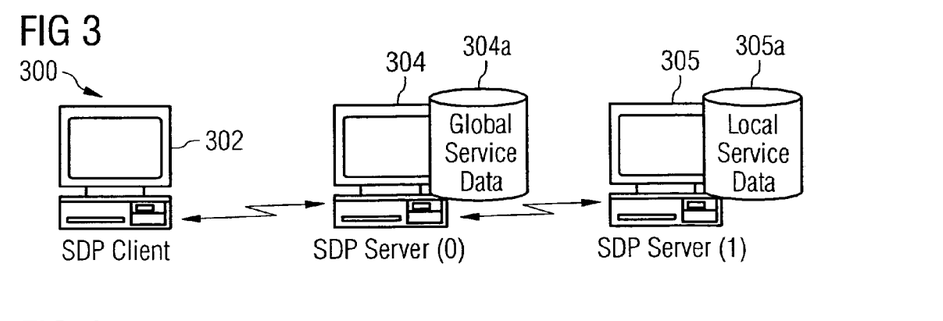
FIG. 3 is a schematic diagram illustrating a service discovery mechanism for a client/server system in a peer-to-peer network environment wherein service discovery information is replicated to multiple servers.

A further embodiment of the present invention pertains to a service discovery mechanism in the peer-to-peer environment of a conventional Bluetooth-enabled Personal Area Network (PAN) as depicted in FIG. 3, wherein a number of peers is provided with service discovery information replicated to multiple peers communicating with each other via the Bluetooth Service Discovery Protocol (SDP) such that wireless nodes communicating with each other via said network can query faster which services are currently available. Thereby, SDP clients are allowed to discover not only services offered by SDP servers said client terminals are directly connected to, but also services offered by remote devices currently connected to said SDP servers. These services can be used by applying a PAN forwarding mechanism on one peer 304 that acts as a forwarding server for a further peer 302. If new devices join the network or already existing network connections are closed, the service database 304a of this forwarding server 304 is continuously updated. In this embodiment, a first peer 302 is connected to a second peer 304 via a first wireless link and the second peer 304 is connected to a third peer 305 via a second wireless link, thereby using the Bluetooth Logical Link Control and Adaptation Protocol (L2CAP) as a data-link-layer protocol. In a typical scenario, the second peer 304 acts as an SDP client and performs a Bluetooth inquiry (S4) to detect active Bluetooth nodes 305 in its radio range, selects (S5a) a third peer 305, which acts as an SDP server for the second peer 304, and opens a first L2CAP channel on a well-known protocol/service multiplexer ($PSM_1$). Moreover, said second peer 304 sends (S6) SDP messages to the third peer 305 to check the availability of services offered by the third peer 305 as well as configuration information for known services or to browse the service database 305a on the third peer 305, establishes (S7a) a Bluetooth PAN link to use services offered by the third peer 305 and adds (S7b) services from the service database 305a of said third peer 305 to its local database 304a. Thereupon, said first second peer 302 acts as an SDP client and performs a Bluetooth inquiry (S8) to detect active Bluetooth nodes 304 in its radio range, selects (S9a) said second peer 304, which then acts as an SDP server for said first peer 302, and opens (S9b) a second L2CAP channel on a further well-known protocol/service multiplexer ($PSM_2$). Thus, said first second peer 302 is able to detect (S10) all available services offered by said second peer 304 and said third peer 305 via SDP without needing to establish a connection to said third peer 305.

In case of extending existing service discovery mechanisms, e.g. the Bluetooth SDP specification, backward compatibility must be maintained. Therefore, it has to be distinguished between "standard SDP queries" and "recursive SDP queries". If a device which does not implement the service discovery mechanism according to the present invention queries the SDP record of an extended SDP server 404 or 405 as described above, only locally reachable services as described in the Bluetooth core specification (http://www.bluetooth.com/pdf/Bluetooth_11_Specifications_Book.pdf) should be returned. As an answer to recursive SDP queries, all services from the network are returned from said SDP server, whereas in case of standard queries SDP records are hidden. This service discovery mechanism allows nodes to detect faster all available service in the Bluetooth-enabled personal area network. Furthermore, recursive SDP responses must also be extended with address information in case the standard is based on a direct peer-to-peer scheme and does not transmit address information.

Figure 5:
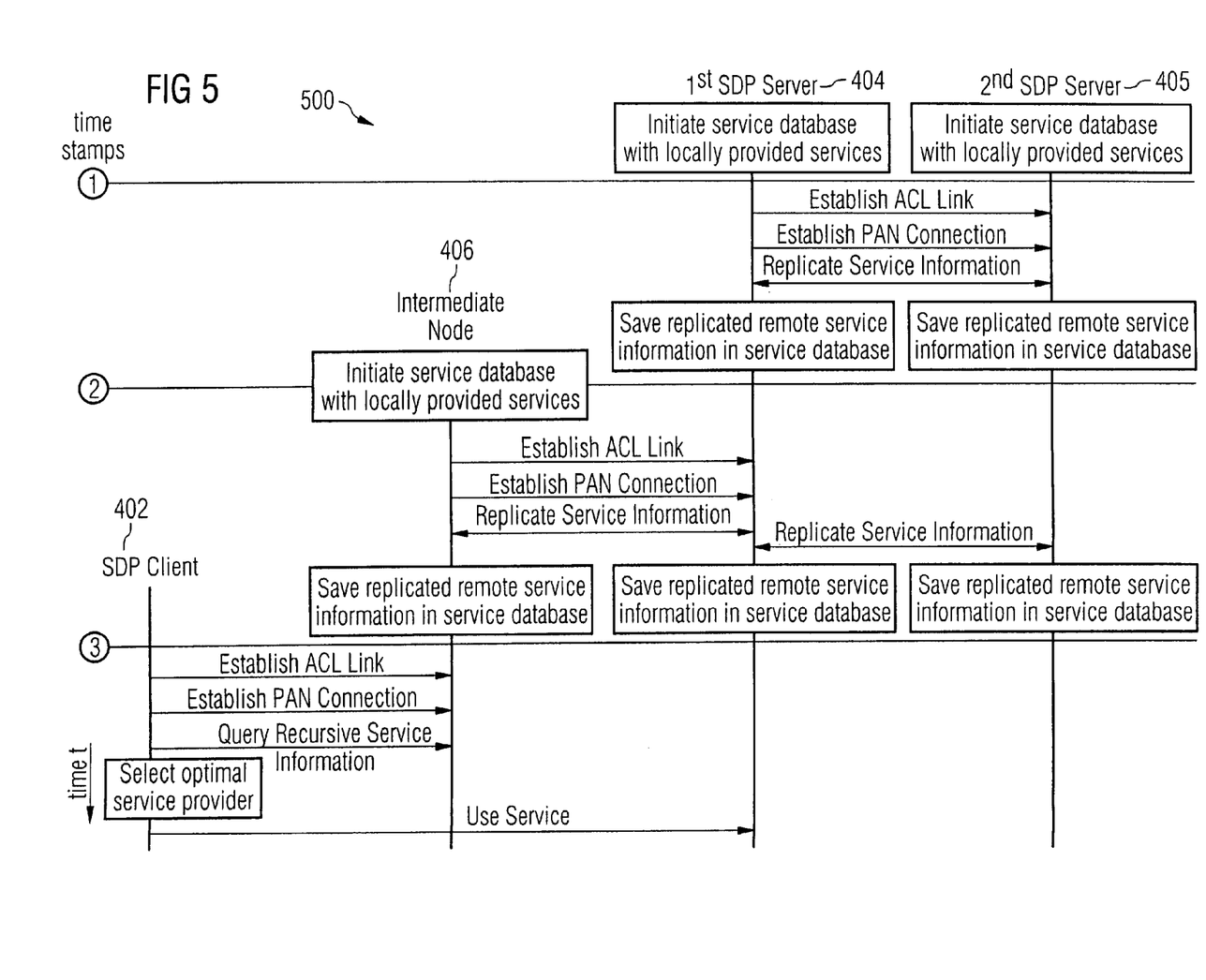
FIG. 5 is a message chart showing the interactions between a Bluetooth-enabled client terminal, an intermediate network node and two Bluetooth-enabled file and/or application servers, which illustrates the process of replicating service discovery information according to the present invention for a client/server system in a peer-to-peer network environment wherein service discovery information is replicated to multiple peers.
Figure 6:
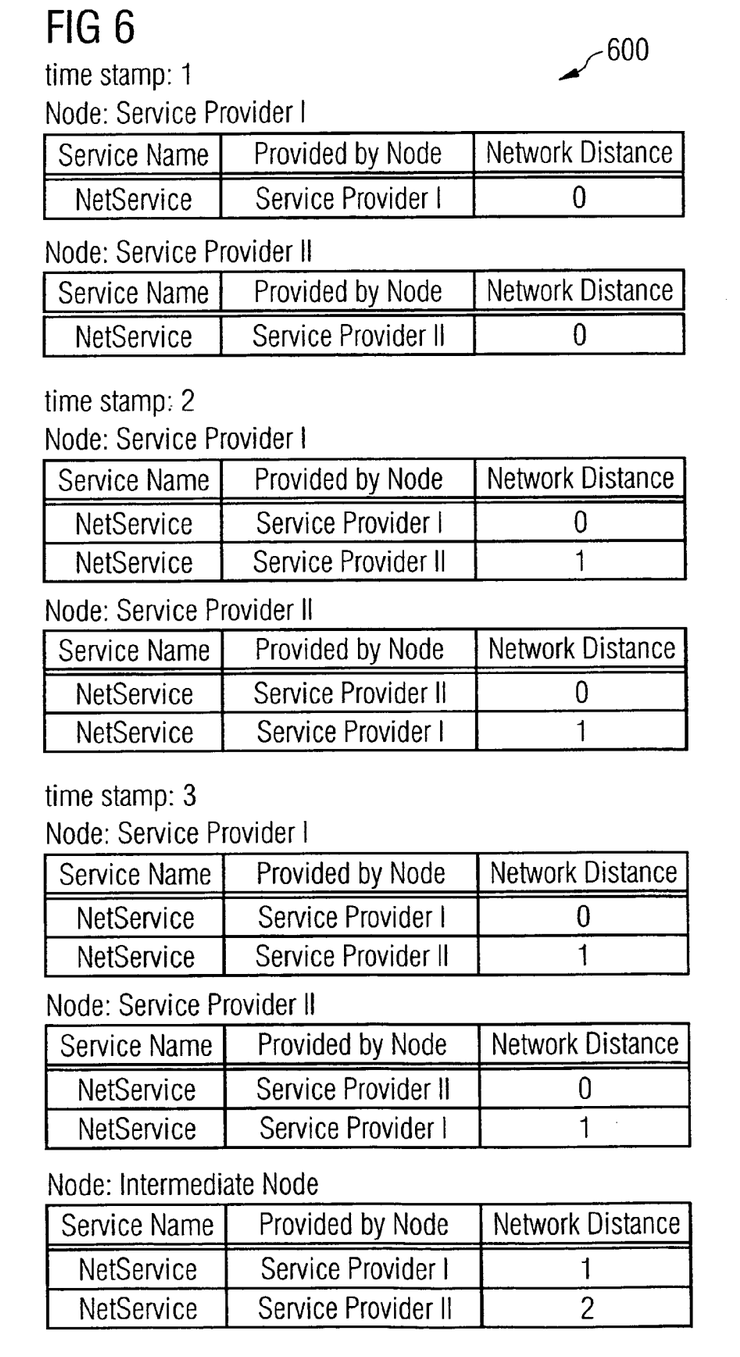
FIG. 6 is a table showing the entries of the service databases of the two Bluetooth-enabled file and/or application servers as well as the entries of a database integrated in an intermediate network node at the times indicated by three time stamps in the message chart depicted in FIG. 5.

A message chart showing the interactions between a Bluetooth-enabled client terminal 402 of a service user, an intermediate network node 406 and the Bluetooth-enabled file and/or application servers 404 and 405 of two different service providers I and II, which illustrates the process of replicating service discovery information according to the present invention for a client/server system 400 in a pervasive peer-to-peer network environment is depicted in FIG. 5. Thereby, service discovery information is replicated to both servers 404 and 405. The table in FIG. 6 shows an example for the entries of the service databases 404a and 405a of the two Bluetooth-enabled file and/or application servers 404 and 405 and the entries of a database integrated in the intermediate network node 406 at the times indicated by the time stamps ①, ②, and ③ from the message chart 500. In this example, only one service called "NetService" is shown, which is provided by the SDP servers 404 and 405. A network distance of '0' thereby indicates that the service is provided locally.

In order to the allow the SDP clients to differentiate between local services and services available via intermediate nodes, the SDP record, which comprises fields for the addresses of service providers offering a requested remote service and optional service-specific SDP values, is supplemented by a "distance field" indicating the number of intermediate nodes between the SDP forwarding server and the network nodes providing a requested service. The SDP clients can evaluate this value and try to directly connect the node since using a forwarding service on intermediate nodes increases the delay. It should be noted that the fields containing the addresses of the service providers and said distance field could be omitted if the service is locally available. In contrast to other service discovery mechanisms, which reside on the network layer, e.g. UPnP or Rendezvous, nodes can discover services without the requirement for an IP setup and get an indication how to set up a physical radio connection to directly connect to said services or via intermediate nodes.

In this connection, a further embodiment of the present invention refers to a data record of a service discovery message for wirelessly exchanging service discovery information between a number of peers in the peer-to-peer environment of a Bluetooth-enabled personal area network by using the Bluetooth Service Discovery Protocol (SDP), which comprises fields for the addresses of service providers offering a requested remote service and optional service-specific SDP values. Said data record comprises a data field that contains an entry indicating the number of intermediate nodes 406 between a peer 404 acting as an SDP proxy server for the client terminal 402 of a service user and network nodes 405 providing a remote service requested by said service user.

The present invention finally pertains to a network node serving as a forwarding server for accessing remotely accessible services in a client/server system 400, wirelessly connected to a client terminal 402 and different file and/or application servers 404 and 405 of a number of service providers via a wireless multi-hop network based on a store-and-forward messaging principle. According to the invention, said network node comprises a service discovery manager unit (SDM) which implements a method for determining the availability of requested remote services in a client/server-based network environment 400 as described above.

The invention claimed is:

1. A method for transmitting service discovery information for determining the availability of requested services in a client/server-based multi-hop wireless Personal Area Network (PAN), wherein each of a plurality of client terminals is connected to a file and/or application server via the multi-hop wireless network based on a store-and-forward messaging principle and communication between said client terminals and server is based on a Service Discovery Protocol (SDP) application-layer protocol, the method comprising:
transmitting at least distance information indicating a number of peers in a peer-to-peer environment of the PAN that are located between a client terminal and a file and/or application server offering a remotely accessible service to the client terminal, wherein
each of the peers are forwarding servers through which the client accesses said remotely accessible service,
the service discovery information includes at least one of distance information, information indicating usage of required remote services and information concerning services provided by servers, and
said service discovery information is dynamically adapted to information concerning varying resource availability and/or changing link characteristics within said wireless network; and
selecting, based on said received distance information, a remote service running on a file and/or application server of a specific service provider at a network distance in the physical proximity of the respective client terminal which can be reached from said client terminal with a minimum forwarding delay and/or with a minimum of peers, wherein
said peers communicating with each other via the SDP, wherein a first peer is connected to a second peer over a first wireless link and said second peer is connected to a third peer over a second wireless link,
wherein said second peer conducting the following steps:
performing an inquiry to detect active nodes in its radio range, thereby acting as an SDP client,
selecting a third peer, which acts as an SDP server for the second peer, and opening a first channel on a first protocol/service multiplexer,
sending SDP messages to the third peer to check availability of services offered by the third peer as well as configuration information for known services or browse a service database on the third peer, and
establishing a PAN link to use services offered by the third peer and adding services from the service database of said third peer to its local database,
and thereafter said first peer conducting the following steps:
performing an inquiry to detect active nodes in its radio range, thereby acting as an SDP client,
selecting said second peer, which then acts as an SDP server for said first peer, and opening a second channel on a second protocol/service multiplexer, and
detecting all available services offered by said second and said third peer via SDP.

2. The method according to claim 1, wherein
cached service discovery information is marked as active only as long as a file and/or application server participates in a wireless communication session with the client terminal and marked as inactive after the connection between said server and the client terminal is closed, and a predefined time-out period has expired, thereby discarding outdated service discovery information.

3. The method according to claim 1, wherein information indicating usage of requested remote services is taken into account during a process of selecting a specific remote service.

4. The method according to claim 1, wherein only locally reachable services are returned when a client terminal queries SDP records of a file and/or application server within said PAN.

5. The method according to claim 1, wherein the wireless PAN is a Bluetooth-enabled Network and the first and the second channels are Logical Link Control and Adaptation Protocol (L2CAP) channels.

* * * * *